July 29, 1958  R. BRUNNER  2,844,880
DIAMETER DIFFERENTIAL GAUGE
Filed Oct. 11, 1954
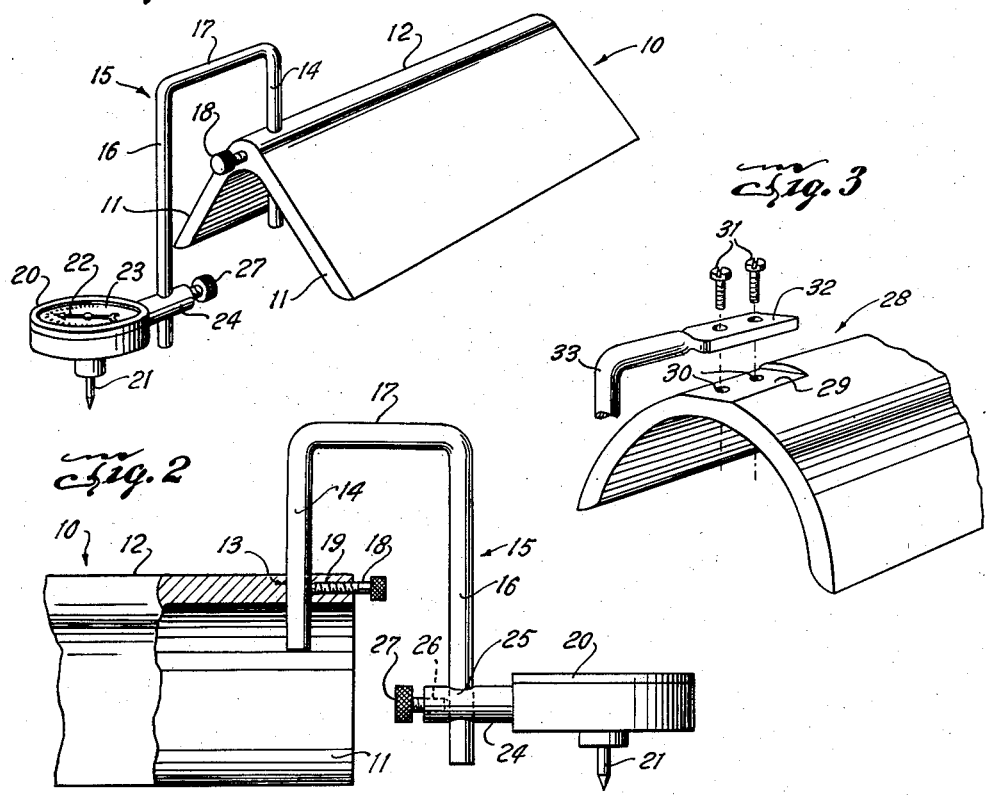
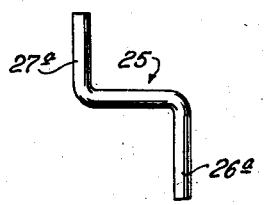
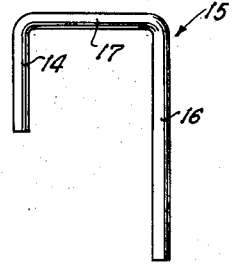
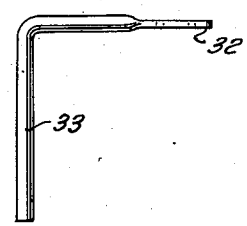
Rudolph Brunner
INVENTOR
ATTORNEY United States Patent Office 2,844,880
Patented July 29, 1958

2,844,880

DIAMETER DIFFERENTIAL GAUGE

Rudolph Brunner, Dallas, Tex.

Application October 11, 1954, Serial No. 461,432

4 Claims. (Cl. 33—178)

This invention relates to measuring instruments and more particularly to an instrument for measuring the diameter differences of cylinders.

The principal object of the invention is to provide a diameter differential gauge having a self-adjusting base which is equipped with means for supporting a pointer gauge or indicator at any desired position above or below the plane of the surface supporting the base, thus to determine the differences in the diameter of adjacent cylinders or the elevational differences between two adjacent planes whether such planes are represented by separate or integral objects.

Another object of the invention is to provide an instrument having special use in the lithographic art for measuring the diameter differences between the operative surface of a press cylinder and its bearers to insure accuracy in offset printing. In this adaptation of the invention, the base of the instrument is placed on the blanketed portion of a cylinder where the indicator is set at 0° reading. The indicator is then moved to a position where it may engage the bearer of the cylinder which may be above or below the plane of the blanket. Thus, an instant reading can be had to determine the differences in thousandths of an inch between the cylinder blanketing and the bearers to indicate the need for increasing or decreasing the cylinder blanketing for more accurate superimposition in printing.

Still another object of the invention is to provide an instrument of simple construction capable of use in determining diameter differences in cylinders as set forth as well as measuring the inner diameters of hollow bodies. Moreover, the instrument, by virtue of its novel construction, may also be used to measure the elevation of objects on plano surfaces.

Other objects will appear as the description proceeds when considered with the annexed drawing, wherein:

Figure 1 is a top perspective view of an instrument constructed according to the invention.

Figure 2 is a fragmentary side elevational view partly in section and on a slightly larger scale.

Figure 3 is a fragmentary perspective view of a modified form of the invention, and Figures 4, 5 and 6 show three different forms of gauge supporting brackets, each constituting a part of the invention.

Continuing with a more detailed description of the invention, reference is primarily made to Figures 1 and 2 in which the instrument base, generally indicated by reference numeral 10, is formed in a substantially V-shape so that it will find its own center in relation to the axis of a cylinder, not shown, on which it is placed in parallelism with the longitudinal axis of the cylinder. The base 10 has angular side flanges 11 and is preferably but not necessarily, formed of extruded metal and machined so that the free edges of the flanges 11 will be precisely parallel to insure positive alignment of the vertex 12 of the body or base 10 with the longitudinal axis of the cylinder on which it rests.

The base 10 has a hole 13 drilled through its apex 12 perpendicular to its longitudinal axis to accommodate the leg 14 of a bracket member 15 with close tolerances between the walls of the hole and the leg so that there will be no lateral displacement of the leg 14.

The bracket 15 is of generally U-shape but the legs are of unequal lengths, the leg 14 being shorter than the companion leg 16 which latter is in exact parallelism with the leg 14. The bight 17 of the bracket 15 is adapted to lie parallel with the longitudinal axis of the base 10 when the instrument is used to find the difference between the diameters of cylinders, such as the body of a cylinder and its end flanges; the blanketing of a press cylinder and its bearers; the body of a cylinder and annular recesses there in and many other similar measurements. When thus positioned, the bracket 15 is secured against movement by means of a set screw 18 which extends through a threaded opening 19 made in one end of the base longitudinally through its apex 12 to meet the bore 13. The inner end of the set screw 18 bears against the leg 14 of the bracket 15 to hold the latter in adjusted positions.

The longer leg 16 of the bracket 15 carries a gauge or indicator 20 of conventional manufacture which is provided with a plunger 21 which, upon engagement with the work, actuates a pointer 22 over a graduated dial 23. Affixed to and extending laterally from the case of the indicator 20 is an arm 24 which is provided with a transverse opening 25 through which slidably extends the leg 16 of the bracket 15. The arm 24 has an axial threaded bore 26 originating at its free end to receive a set screw 27 which bears against the leg 16 of the bracket to hold the gauge 20 in adjusted positions on the leg 16.

It is readily apparent from the foregoing that the bracket 15 and gauge 20 may assume several different positions in taking various measurements but the particular measurement for which the form of the invention just described was designed is the determination of diameter differences in adjacent cylinders.

In operation, the base 10 is placed on the body of a cylinder and it immediately assumes a position parallel with the longitudinal axis of the cylinder. If the adjacent cylinder or a part of the same cylinder is lower than the main cylinder supporting cylinder such as in the blanketing of a lithographic cylinder, the gauge 20 is lowered on the bracket leg 16 so that the tip of its plunger 21 will just touch the surface of the main cylinder to obtain a zero reading. The base 10 is then shifted so that the plunger 21 will engage the lower plane of the adjacent cylinder. The difference between the zero reading and the pointer position at the second reading will reveal the difference between the diameters of the cylinders. The foregoing would apply equally as well in cases where the second reading is of a plane higher than that where the first reading is taken such as the measuring of the differences in diameters of a cylinder and its end flanges.

In order to adopt the instrument to the measurement of the inside diameters of cylinders it is necessary only to replace the bracket 15 with the bracket 25a shown in Figure 4. The leg 26a will be received in the hole 13 of the base 10, to be held in adjusted positions by the set screw 18. The leg 27a of the bracket will extend upwardly and will slidably support the gauge 20 in inverted position as compared to its position in Figure 1, so that its plunger 21 will contact the inner surface of the wall of the hollow body above the base 10. The gauge is set at zero reading as in the measuring of outer diameter, after which the instrument is shifted so that the plunger 21 will engage an adjacent surface on a higher or lower plane and the difference in readings of the gauge will reveal the differences in inner and outer diameters. The same adjustments are possible with this form of bracket as with the form shown in Figures 1, 2 and 5.

In Figure 3 is shown a modified form of the invention. In this form, the base 28 is of semi-cylindrical form and has a flat 29 to receive screws 31 which secure the flattened end 32 of a rod 33 to the flat 29.

The rod 33 referred to above constitutes the bracket in the modified form of the invention for supporting a gauge, not shown in Figure 3 but which is identical to that shown in the preceding figures and as described above. A complete form of the bracket 33 is shown in Figure 6. The operation and function of the instrument illustrated in Figure 3 are identical to that shown in Figures 1 and 2, except that the modified form of the invention is not designed to measure inside diameters of hollow bodies.

Manifestly, the construction as shown and described is capable of some modification and such modification as may be construed to fall within the scope and meaning of the appended claims is also considered to be within the spirit and intent of the invention.

What is claimed is:

1. As a new article of manufacture, a measuring instrument comprising an elongated base having downwardly divergent side portions defining an apex coextensive with the longitudinal axis of the base, the base having a hole adjacent one end of its apex traversing its longitudinal axis and a threaded hole in its end intersecting the first hole, a substantially U-shaped bracket having legs of unequal length, the shorter of the legs being slidable in the first hole, a pointer gauge slidably adjustable on the longer leg of the bracket, means for holding the gauge in adjusted position on the longer leg, and means in the threaded hole for securing the shorter leg to hold the bracket in adjusted position in relation to the base.

2. A measuring instrument comprising an elongated, substantially V-shaped base adapted to be disposed on a cylindrical work piece with its apex parallel with the longitudinal axis of the work piece, a bracket of inverted U shape having one leg slidably disposed in a hole in the apex of the base adjacent one end thereof and traversing its longitudinal axis, the companion leg of the bracket extending below the apex of the base and being disposed perpendicular to the plane of the work piece, a gauge slidably mounted on the companion leg of the bracket and having a plunger engageable with the work piece, means carried by the base for securing said one leg of the bracket to the base to hold the bracket in adjusted position, and means for securing the gauge in adjusted position on the companion leg.

3. A device of the character described comprising an elongated base of substantially inverted V shape adapted for self-adjustment on and in relation to the longitudinal axis of a cylindrical body, a rod formed in substantially inverted U shape defining a bracket, one leg of the bracket being slidable through a hole adjacent one end of the base in a plane perpendicular to the longitudinal axis of the base, the companion leg of the bracket being spaced from said end of the base, a gauge adjustable longitudinally on the companion leg and having a plunger engageable with the cylindrical body and adjacent elements thereof, and means for securing the gauge to the bracket in adjusted position.

4. An instrument for measuring the radial distance between a first cylindrical surface and a second cylindrical surface positioned in close proximity to one end of the first cylindrical surface and aligned axially therewith, the cylindrical surfaces being spaced radially relative to each other, comprising an elongated, substantially V-shaped base adapted to be disposed on the first cylindrical surface with its apex parallel with the longitudinal axis of the cylindrical surfaces, a bracket of inverted U shape having one leg slidably disposed in a hole in the apex of the base adjacent one end thereof and traversing its longitudinal axis, the companion leg of the bracket extending below the apex of the base and being disposed perpendicular to the longitudinal axis of the cylindrical surfaces, a gauge slidably mounted on the companion leg of the bracket and having a plunger for selective engagement with the cylindrical surfaces, means carried by the base for securing said one leg of the bracket to the base to hold the bracket in adjusted position, and means for securing the gauge in adjusted position on the companion leg.

References Cited in the file of this patent

UNITED STATES PATENTS

| 2,375,448 | Talbot et al. | May 8, 1945 |
| 2,398,066 | Whale | Apr. 9, 1946 |
| 2,503,871 | Hartl | Apr. 11, 1950 |

FOREIGN PATENTS

| 647,674 | Germany | July 8, 1937 |
| 484,126 | Great Britain | May 2, 1938 |